L. B. GOUD.
DEVICE FOR MANUALLY MOVING AUTOMOBILES.
APPLICATION FILED AUG. 17, 1917.
1,270,724.
Patented June 25, 1918.
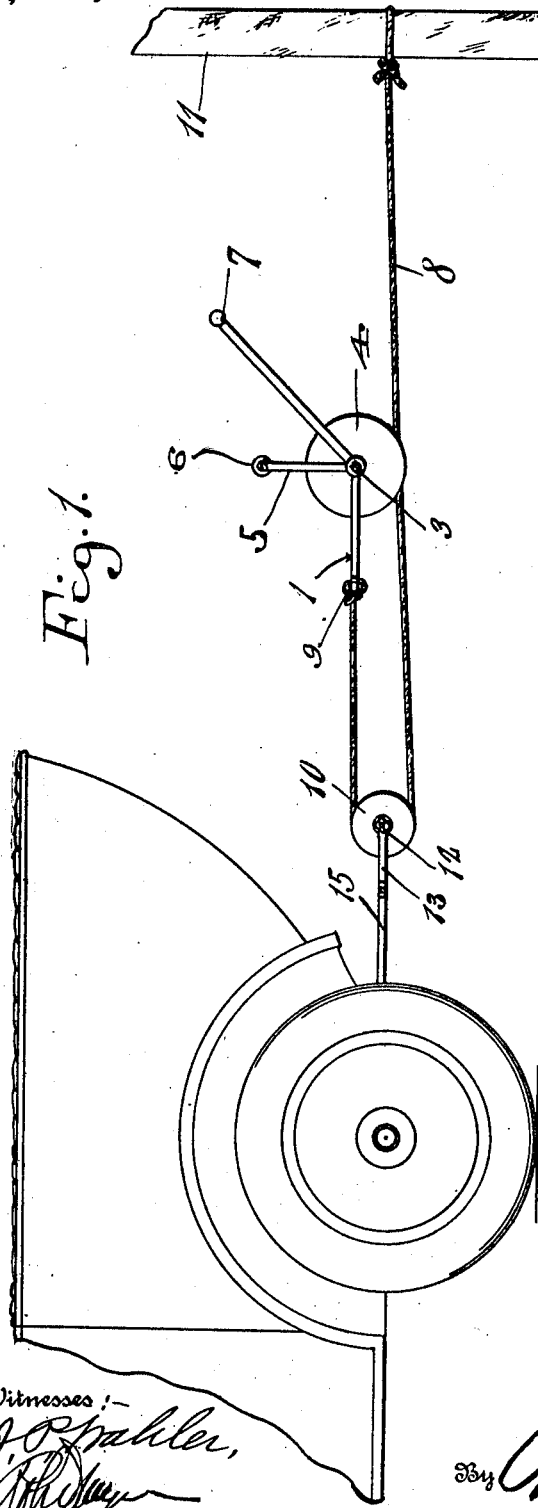
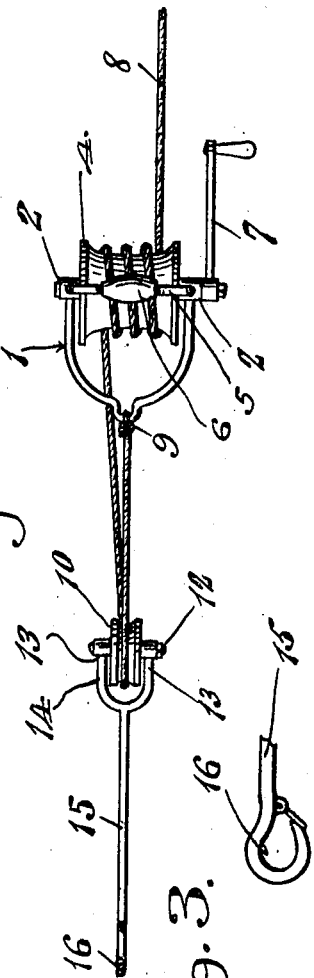
Inventor
L. B. Goud.

UNITED STATES PATENT OFFICE.

LYMAN B. GOUD, OF WHEELING, WEST VIRGINIA.

DEVICE FOR MANUALLY MOVING AUTOMOBILES.

1,270,724.  Specification of Letters Patent.  Patented June 25, 1918.

Application filed August 17, 1917. Serial No. 186,719.

*To all whom it may concern:*

Be it known that I, LYMAN B. GOUD, a citizen of the United States, residing at Wheeling, in the county of Ohio and State of West Virginia, have invented certain new and useful Improvements in Devices for Manually Moving Automobiles; and I do hereby declare the following to be a full, clear, and exact description of the invention, such as will enable other skilled in the art to which it appertains to make and use the same.

This invention relates to a device for manually moving automobiles, and one which is particularly designed for moving an automobile when the same becomes stuck or stalled in mud, sand or any other place upon a roadway, which might impede the travel of the automobile or like vehicle.

An object of this invention is to provide a device including a drum, about which a cable is wound, which cable is connected to a bail member that is attached to the supporting shaft or axle of the drum and passes about a pulley, for winding upon the drum, and also to connect the end of the cable which is free from connection to the bail member, to an anchor, such as a tree, or other suitable support so that when the cable is wound upon the drum, it will draw an automobile or other vehicle toward the anchor.

With the foregoing and other objects in view, this invention consists in such novel features of construction, combination and arrangement of parts as will be hereinafter more fully described, illustrated in the accompanying drawings and claimed.

In describing the invention in detail reference will be had to the accompanying drawing wherein like characters designate like and corresponding parts throughout the several views, and in which:

Figure 1 is a side elevation of the device showing the same applied,

Fig. 2 is a plan view of the device, and

Fig. 3 is a detail side elevation of the hook which is connected to the automobile or other vehicle.

Referring more particularly to the drawing, 1 designates a bail member which is constructed of any suitable material, and lies in a horizontal plane, having bearings 2 formed upon the ends of its legs which support a shaft 3 upon which a drum 4 is mounted. The bail member 1 has a substantially inverted U-shaped handle 5 attached thereto, the lower ends of which are formed integrally with the bearings 2. The handle 5 extends upwardly at right angles to the bail member 1, and it has a hand grip 6 mounted upon the upper bight portion of the same, as clearly shown in the drawing. The handle 5 is provided for steadying the device during the operation of the same. A crank handle 7 is mounted upon the end of the shaft 3 for manually rotating the shaft, for winding the cable 8 upon the drum 4. The cable 8 is rigidly attached as shown at 9 to the bail member 1, and it passes about a concave pulley 10, returning to the drum 4 about which it is wound, as shown in Fig. 2. The cable extends rearwardly from the drum 4 and is adapted for attachment to an anchor of any suitable source as indicated at 11 in Fig. 1 of the drawing.

The cable may be attached to a tree alongside the road over which the vehicle is traveling, or if it is so desired, a suitable anchor may be provided. This does not form a part of the invention.

The pulley 10 is rotatably mounted upon a pin 12 which is carried by the end 13 of the fork end 14 of a rod 15. The rod 15 has a connecting hook 16 formed upon its free end which is adapted for connection with the rear axle or any other suitable part of a motor vehicle to be moved by the winding of the cable 8 upon the drum 4.

In reducing the invention to practice, certain minor features of construction, combination and arrangement of parts, may necessitate alterations to which the patentee is entitled provided such alterations are comprehended within the scope of what is claimed.

What is claimed is:—

In a device as set forth, the combination, of a bail member, said bail member having an enlarged bearing, a shaft carried by the enlarged bearing, a drum mounted upon the said shaft, a substantially inverted U-shaped member formed integrally with the bearing of said bail member and at right-angles thereto and over the drum, a connecting rod having one end forked, a pulley rotatably carried by the forked end of said connecting rod, a cable connected to said bail member intermediate its ends and extending over said pulley, said cable being wound about said drum and having one end extending away from the drum and adapted for connection with an anchor, and a crank handle mounted upon said shaft for manually rotating said drum.

In testimony whereof I affix my signature in presence of two witnesses.

LYMAN B. GOUD.

Witnesses:
WM. B. CASEY,
J. E. WEAVER.

Copies of this patent may be obtained for five cents each, by addressing the "Commissioner of Patents, Washington, D. C."